(12) United States Patent
Robinson et al.

(10) Patent No.: US 7,692,709 B2
(45) Date of Patent: Apr. 6, 2010

(54) END-TO-END DESIGN OF ELECTRO-OPTIC IMAGING SYSTEMS WITH ADJUSTABLE OPTICAL CUTOFF FREQUENCY

(75) Inventors: M. Dirk Robinson, Menlo Park, CA (US); David G Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 955 days.

(21) Appl. No.: 11/433,780

(22) Filed: May 12, 2006

(65) Prior Publication Data

US 2007/0268375 A1 Nov. 22, 2007

(51) Int. Cl.
*H04N 5/225* (2006.01)
(52) U.S. Cl. .................. 348/335; 348/342
(58) Field of Classification Search .................. 348/355
See application file for complete search history.

(56) References Cited

U.S. PATENT DOCUMENTS

| | | | |
|---|---|---|---|
| 5,227,890 A | 7/1993 | Dowski | |
| 5,521,695 A | 5/1996 | Cathey | |
| 5,748,371 A | 5/1998 | Cathey | |
| 5,870,179 A | 2/1999 | Cathey | |
| 6,021,005 A | 2/2000 | Cathey | |
| 6,069,738 A | 5/2000 | Cathey | |
| 6,525,302 B2 | 2/2003 | Dowski | |
| 6,567,570 B1 | 5/2003 | Steinle et al. | |
| 6,842,297 B2 | 1/2005 | Dowski | |
| 6,873,733 B2 | 3/2005 | Dowski | |
| 6,911,638 B2 * | 6/2005 | Dowski et al. | 250/201.9 |
| 6,940,649 B2 | 9/2005 | Dowski | |
| 7,115,849 B2 * | 10/2006 | Dowski et al. | 250/201.9 |
| 7,400,456 B2 * | 7/2008 | Smith | 359/708 |
| 7,436,595 B2 * | 10/2008 | Cathey et al. | 359/558 |
| 2002/0118457 A1 | 8/2002 | Dowski | |
| 2002/0195548 A1 | 12/2002 | Dowski | |
| 2003/0016301 A1* | 1/2003 | Aizaki et al. | 348/345 |
| 2003/0057353 A1 | 3/2003 | Dowski | |
| 2003/0169944 A1 | 9/2003 | Dowski | |
| 2003/0173502 A1 | 9/2003 | Dowski | |
| 2004/0145808 A1 | 7/2004 | Cathey | |
| 2004/0190762 A1 | 9/2004 | Dowski | |
| 2004/0228005 A1 | 11/2004 | Dowski | |
| 2004/0257543 A1 | 12/2004 | Dowski | |

(Continued)

OTHER PUBLICATIONS

Fales, C.L. et al., "Imaging System Design for Improved Information Capacity," Applied Optics, Mar. 15, 1984, pp. 872-888, vol. 23, No. 6.

(Continued)

*Primary Examiner*—Lin Ye
*Assistant Examiner*—Amy Hsu
(74) *Attorney, Agent, or Firm*—Fenwick & West LLP

(57) ABSTRACT

An optical system that behaves like an integrated low pass filter with an adjustable optical cutoff frequency. The filter behavior is "integrated" in the sense that the overall design of the optical system results in the low pass filter characteristic, rather than having a separate, discrete component that implements the low pass filtering. The filter behavior is "adjustable" in the sense that the optical system can be adjusted in a manner that changes the optical cutoff frequency of the MTF. For example, moving certain optical components within the optical system may cause the change in cutoff frequency.

18 Claims, 14 Drawing Sheets

U.S. PATENT DOCUMENTS

| | | | |
|---|---|---|---|
| 2005/0088745 | A1 | 4/2005 | Cathey |
| 2005/0197809 | A1 | 9/2005 | Dowski |
| 2005/0264886 | A1 | 12/2005 | Dowski |
| 2006/0061878 | A1* | 3/2006 | Smith .......................... 359/708 |
| 2006/0110147 | A1* | 5/2006 | Tomita et al. .................. 396/55 |
| 2006/0139476 | A1* | 6/2006 | Sasaki ......................... 348/342 |
| 2007/0247733 | A1* | 10/2007 | Shiozawa et al. ........... 359/885 |

OTHER PUBLICATIONS

Cathey, W. Thomas et al., "New Paradigm for Imaging Systems," Applied Optics, Oct. 10, 2002, pp. 6080-6092, vol. 41.

Farrell, Joyce E. et al., "A Simulation Tool for Evaluating Digital Camera Image Quality," Image Quality and System Performance, Ed. Yoichi Miyake et al., Proceedings of SPIE-IS&T Electronic Imaging Conference, 2004, pp. 124-131, vol. 5294.

Kolb, Craig et al., "A Realistic Camera Model for Computer Graphics," Computer Graphics, Proceedings of SIGGRAPH 1995, pp. 317-324.

Maeda, Patrick Y. et al., "Integrating Lens Design with Digital Camera Simulation," 5678 SPIE Proceedings SPIE Electronic Imaging, Feb. 2005, pp. 48-58, San Jose, CA.

* cited by examiner

END-TO-END DESIGN OF ELECTRO-OPTIC IMAGING SYSTEMS WITH ADJUSTABLE OPTICAL CUTOFF FREQUENCY

BACKGROUND OF THE INVENTION

1. Field of the Invention

This invention relates generally to optical systems and, more particularly, to optical systems designed to behave as low pass filters with an adjustable optical cutoff frequency, including the "end-to-end" design of such systems.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). In most electro-optical imaging systems, the spatial sampling rate of the photodetector is well below the diffraction limit of the optical subsystem. In current technology, the smallest pixel dimensions (i.e., pixel-to-pixel pitch) are typically on the order of 3 to 4 microns. The corresponding Nyquist rate associated with such pixel dimensions are between 125 and 166 line pairs per millimeter (lp/mm). It is not uncommon to have optical subsystems with an F# as low as 3 or 4. Given that the diffraction limit is given by $1/(\lambda F\#)$, diffraction limited optical subsystems can pass image content with spatial frequencies as high as 500 lp/mm in the visible spectrum.

FIG. 1 shows an example of a modulation transfer function (MTF) 110 for an F/4.5 diffraction-limited optical subsystem, the MTF 120 for a 100 percent fill factor 15 micron pitch pixel, and the cumulative MTF 130 for the optical subsystem and detector together. For convenience, the MTF for the optical subsystem will be referred to as the optical MTF 110, the MTF for the detector subsystem as the detector MTF 120, and the combined MTF as the imaging MTF 130. The imaging MTF is the product of the optical MTF and the detector MTF. Also shown is the Nyquist rate for the detector subsystem which is 33 lp/mm in this example. The Nyquist sample rate will also be referred to as the detector sampling frequency. The box 140 indicates the MTF region up to the Nyquist rate. There is a significant fraction of the imaging MTF 130 that lies outside the sampling band 140 (i.e., at frequencies higher than the sampling frequency). Consequently, this electro-optical imaging system has the potential to pass image content with spatial frequencies above the Nyquist rate.

In theory, the image content at higher frequencies could be captured by reducing the pitch of the detector array, thus increasing the detector sampling frequency. However, the ability to shrink pixel dimensions is limited. As pixel dimensions shrink, the dynamic range and signal to noise ratio (SNR) of pixels degrade.

Returning to FIG. 1, when spatial frequency information above the Nyquist rate is sampled, the final image may contain aliasing artifacts such as moiré patterns. The effect of aliasing is even more pronounced in color systems using a single photodetector. In such cases, the color filter pattern reduces the Nyquist rate by a factor of two further exacerbating the problem of aliasing. Researchers have developed a variety of techniques to eliminate aliasing artifacts. To some degree or another, these approaches typically involve some form of discrete component that acts as an optical low pass filter, thus effectively destroying the information content above the Nyquist rate. For instance, Kodak sells an optically transparent plate that is placed directly in front of the detector. The plate has randomly placed particles which introduce random phase errors. This effectively blurs the optical image, thus reducing the content at frequencies above the Nyquist rate and reducing the effects of aliasing.

In another approach, a birefringent plate is used as a discrete low pass filter. The image content is replicated in a color-dependent fashion using the spatial shifting property of the birefringent plate. The birefringent plate replicates the point spread function of the optical subsystem but shifted with respect to the original point spread function. The cumulative point spread function created by the original and its shifted versions can span one or two pixel widths. This replication effectively blurs the optical image to reduce frequency information above the Nyquist rate. However, such optical low pass filters often are wavelength dependent.

In yet another approach, CDM Optics of Boulder, Colo. developed a specially designed component: a phase plate that is placed at the aperture of the optical subsystem in order to encode the incoming wavefront in a particular way. Digital image processing is used later to reverse the encoding introduced by the phase plate and retrieve certain image content. However, the CDM approach appears to work for only certain types of artifacts and it can produce overly smooth images.

One drawback of these approaches is that an additional component is added to the optical subsystem, thus increasing the complexity and cost. Another drawback is that these components typically are designed for a specific situation. If the optical subsystem is itself adjustable for use over a range of situations (different F#'s, focal lengths, etc.), or can be used with a variety of different detector subsystems and/or digital image processing subsystems, a single one of these components may not be flexible enough to accommodate the various situations and adjustable versions of these components may not be available.

Thus, there is a need for approaches that can reduce aliasing effects, but in a manner that overcomes some or all of the above drawbacks.

SUMMARY OF THE INVENTION

The present invention overcomes the limitations of the prior art by providing an optical system that behaves like an integrated low pass filter with an adjustable optical cutoff frequency. The filter behavior is "integrated" in the sense that the overall design of the optical system results in the low pass filter characteristic, rather than having a separate, discrete component that implements the low pass filtering. The filter behavior is "adjustable" in the sense that the optical system can be adjusted in a manner that changes the optical cutoff frequency of the MTF. For example, moving certain optical components within the optical system may cause the change in cutoff frequency.

One advantage of this approach is that, when used as a subsystem in an electro-optic imaging system, the optical subsystem can be designed to reduce aliasing or moiré effects in the overall electro-optic imaging system. For example, if the detector subsystem has a certain pitch, the optical subsystem preferably is designed (or adjusted) so that its optical cutoff frequency matches the detector sampling frequency. If the detector pitch is adjustable (for example because the detector is variable geometry), the optical cutoff frequency can be adjusted accordingly.

Alternately, the adjustable optical subsystem can be designed to be used with detector subsystems of different pitches. When the optical subsystem is used with a detector subsystem having a short pitch, the optical cutoff frequency is adjusted to match the short pitch. If it is used with a detector subsystem having a longer pitch, the optical cutoff frequency is adjusted to match the longer pitch. In this way, the same optical subsystem can be used with many different detector subsystems but without unduly introducing unwanted aliasing effects.

In one aspect of the invention, an electro-optic imaging system includes an adjustable optical subsystem, a detector subsystem and a digital image processing subsystem. The detector subsystem is characterized by a detector sampling frequency. The optical subsystem is designed to reduce aliasing. As a result, the actual optical MTF of the optical subsystem contains a higher fraction of energy in the sampling band (i.e., the frequencies below the detector sampling frequency), than would normally be contained in the optical MTF for a diffraction-limited optical subsystem. For example, the optical subsystem may be designed in such a way that the imaging MTF (i.e., the combination of the optical MTF and the detector MTF) is effectively zero above a certain spatial frequency while preserving the good MTF performance within the sampling band of the system. Contrast is preserved in the sampling bandwidth of the imaging system by not having zero-crossings or extremely low MTF within the sampling bandwidth. In this way, image content is concentrated in the detector sampling band, which are the frequencies that are useable by the digital image processing subsystem. Image content at higher frequencies is reduced, thus reducing aliasing effects.

Other aspects of the invention include methods for designing the devices and systems described above, and applications of all of the above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
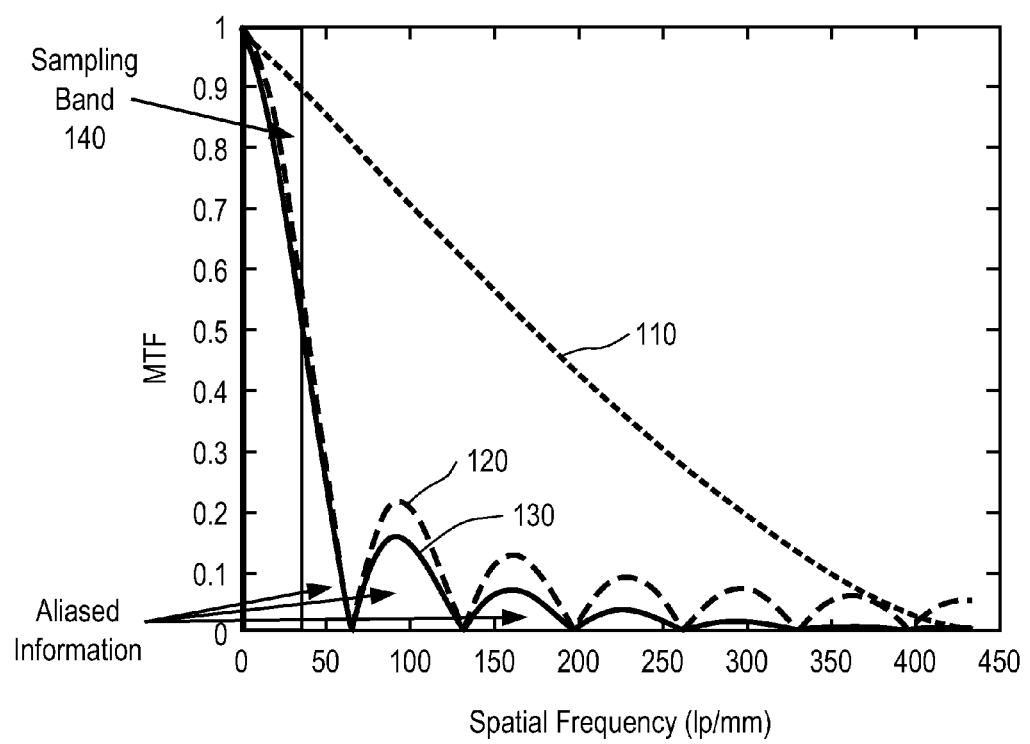
FIG. 1 (prior art) is a graph showing modulation transfer functions (MTFs) of an electro-optic imaging system.
Figure 2:
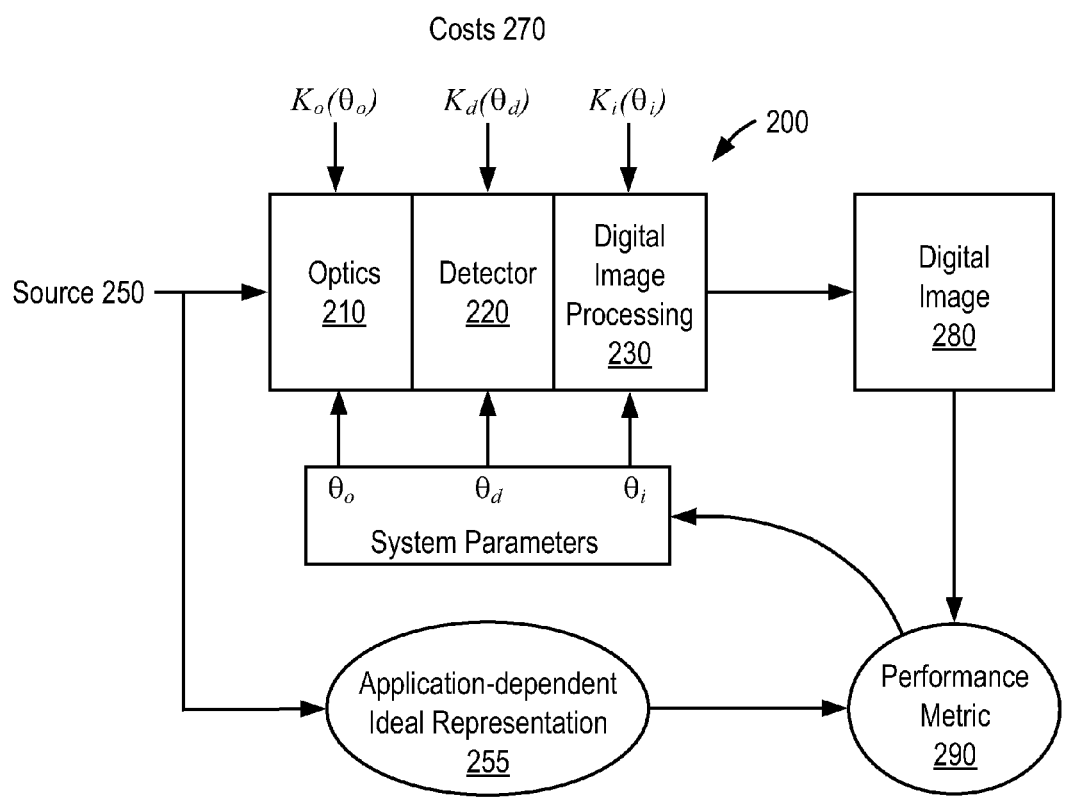
FIG. 2 is a block diagram illustrating the problem of designing an electro-optic imaging system.

FIG. 2 is a block diagram that depicts an electro-optic imaging system 200 that contains an optical subsystem 210 according to the invention. In addition to the optical subsystem 210, the electro-optic imaging system 200 also includes detector subsystem 220 and digital image processing subsystem 230.

Figure 3:
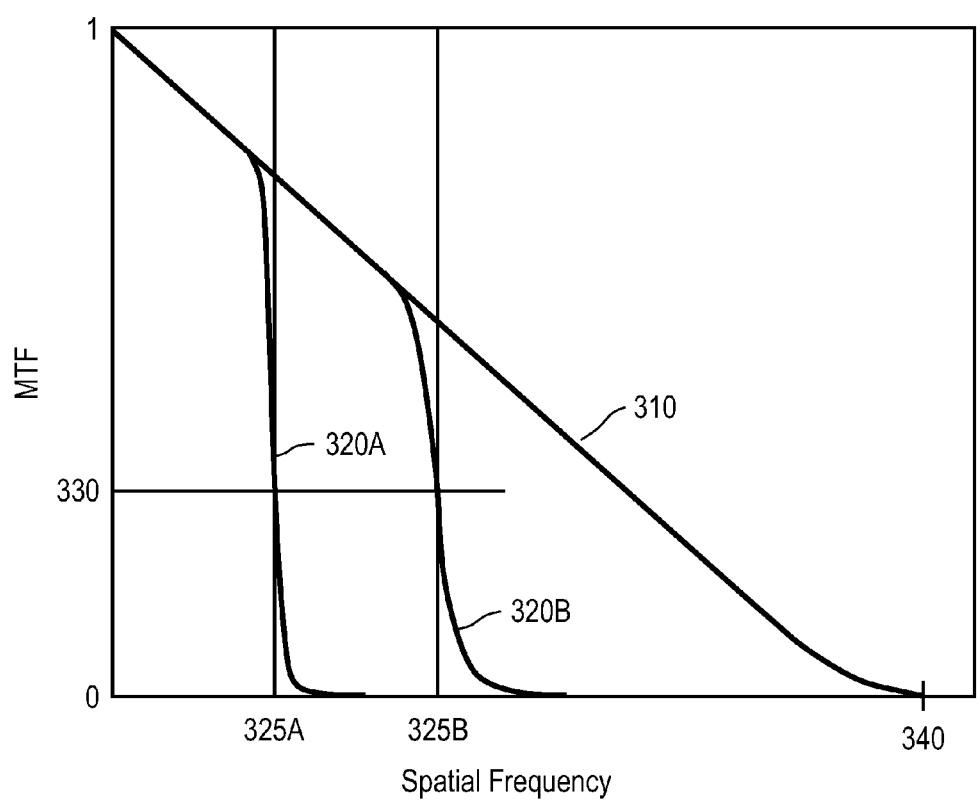
FIG. 3 is a graph illustrating the MTF of an optical subsystem with a varying optical cutoff frequency.

The optical subsystem 210 can be adjusted to reduce aliasing for a number of different situations. FIG. 3 is a frequency diagram that illustrates one example of this concept. In this example, the optical subsystem 210 is designed to be used with detector subsystems of different detector pitches. Refer to the detector subsystems as A and B. In FIG. 3, curve 310 is the MTF of an equivalent diffraction-limited optical subsystem. The actual optical subsystem is not diffraction-limited. Rather, it is designed to behave like a low pass filter in order to reduce aliasing effects. Frequency 325A is the detector sampling frequency for detector subsystem A. Frequency 325B is the detector sampling frequency for detector subsystem B.

Curve 320A shows a near-ideal optical MTF for the optical subsystem 210 when it is used with detector subsystem A. The optical MTF has an optical cutoff frequency that matches the detector sampling frequency 325A and the subsystem 210 therefore reduces image content at frequencies above the detector sampling frequency 325A. Similarly, curve 320B shows a near-ideal optical MTF for the optical subsystem 210 when it is used with detector subsystem B. The optical MTF reduces image content at frequencies above the detector sampling frequency 325B. The optical subsystem 210 is designed so that it can be adjusted between optical MTFs 320A and 320B.

The optical cutoff frequency can be defined in a number of ways. For instance, in the example of FIG. 3, the cutoff frequency is defined as the spatial frequency at which the optical MTF falls below a preselected minimum value 330. In FIG. 3, the optical low pass filter is designed so that the cutoff frequency is the same as the detector sampling frequency 325A or 325B. In other designs, the minimum value may be defined relative to the diffraction limited MTF, rather than as an absolute number as shown in FIG. 3. In addition, the cutoff frequency may vary from the detector sampling frequency in some designs.

Alternately, the effectiveness of the anti-aliasing properties of the optical subsystem may be defined by the spatial frequency above which the optical MTF consistently falls below a prescribed value. Another representation of the effectiveness of the anti-aliasing characteristics of the optical subsystem might be the integration of the optical MTF between the detector sampling frequency (325A or B) and the diffraction limit 340. This is a measure of the energy that falls outside the sampling band. It may be specified to fall below a particular target number. One could also imagine a ratio of the integral of the MTF up to the detector sampling frequency divided by the integral of the MTF between the detector sampling frequency and the diffraction limit. These metrics are some examples that can be used to measure the "quality" of an imaging system with respect to its low-pass filtering ability. Other metrics will be apparent. Similar metrics can be used with respect to the imaging MTF (which also takes the detector MTF into account), rather than just the optical MTF.

The remainder of FIG. 2 illustrates the problem of designing such an optical subsystem 210. The overall imaging system 200 is intended to image a source 250 and produces digital image 280. The general design problem is to design the optical subsystem 210 and/or imaging system 200 to "optimize" its overall performance, subject to certain constraints. In many cases, the goal of optimization is to produce a digital image 280 which matches the application-specific idealized version 255 of the input source.

Figure 4:
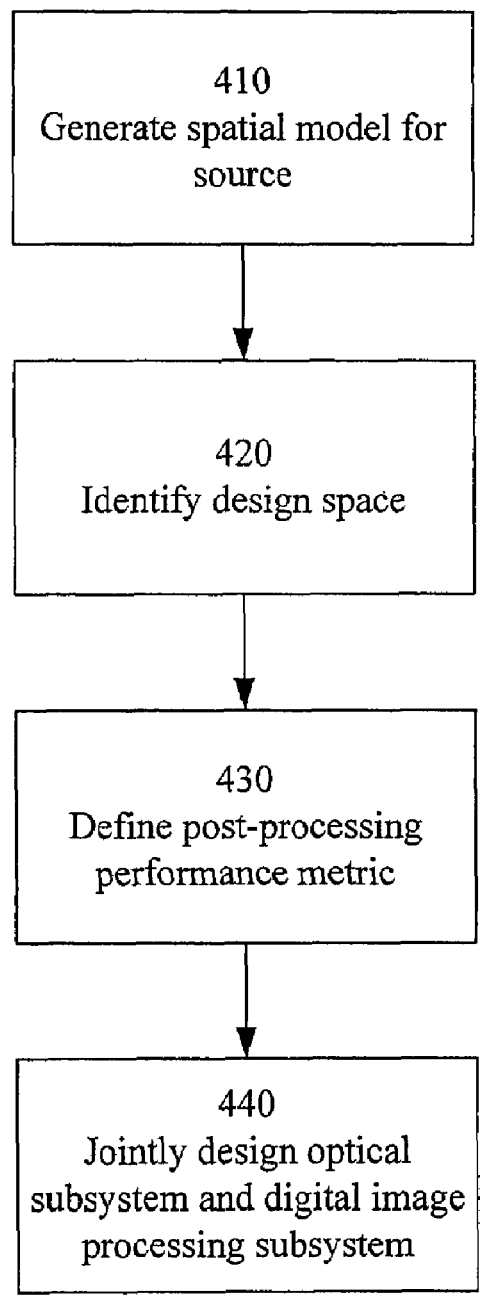
FIG. 4 is a flow diagram illustrating a method for designing an electro-optic imaging system according to the present invention.

FIGS. 2 and 4 illustrate an example method for designing an electro-optic imaging system 200 according to the present invention. The following example is given with respect to designing the overall system 200. However, the principles illustrated can also be used to design just the optical subsystem 210. Referring to FIG. 4, the design method includes generating 410 a spatial model of the source 250. The spatial model of the source may be derived for a specific situation, empirically measured, based on previously developed models or otherwise provided. Illumination, radiometry and geometry are factors that may be reflected in the source model. The spatial model preferably includes a statistical model of the source.

The design space for the optical subsystem 210 is also defined 420. In FIG. 2, each of the subsystems is defined by its parameters $\theta_o$, $\theta_d$ and $\theta_i$, respectively. For example, the design space for the optical subsystem 210, described by the vector $\theta_o$, may be defined by number, type and size of lenses, radii of curvature, stops, etc. The design space for the detector subsystem 220, described by the vector $\theta_d$, may parameterize the number of pixels, detector spacing, fill factor, bandwidth, pixel geometry, etc. In this particular example, the digital image processing subsystem 230 includes digital filter(s) so the design space for the digital image processing subsystem 230, described by the vector $\theta_i$, may identify the parameters for the digital filter(s) (e.g., number of coefficients, coefficient values, etc). Various non-imaging constraints or costs 270 associated with the designs may also be defined. The size of the design space of each subsystem will vary depending on the application. In some cases, there may be much latitude in designing a subsystem. In other cases, the design of the subsystem may be tightly constrained or even pre-defined (e.g., if the detector array is selected a priori). For example, if only the optical subsystem 210 is being designed, the only design parameters may be $\theta_o$. In fact, the detector subsystem 220 and digital image processing subsystem 230 may not even be specified. Representative subsystems may be used to model their performance.

A post-processing performance metric 290 is also defined 430. The performance metric is post-processing in the sense that it is based on performance after image processing rather than before image processing. For examples, measures of the wavefront error or spot size of the intermediate optical image produced by the optical subsystem alone may be conventional error metrics for the optical subsystem but they are not post-processing performance metrics. In FIG. 2, the post-processing performance metric 290 is based on a comparison of the digital image 280 produced by the imaging system 200 compared to the ideal digital image 255. In many design situations, the image 280 produced by the system is calculated by modeling propagation of the source characteristics 250 through the subsystems 210, 220 and 230 based on the spatial model of the source.

The design step 440 can be described as selecting a design within the design space that optimizes the post-processing performance metric 290, possibly subject to certain constraints (e.g., limits on the digital filter design). The optical subsystem 210 and the digital image processing subsystem 230 are designed together, rather than sequentially as is the case in conventional design approaches. Mathematically, using the notation of FIG. 2, the design step can be described as selecting the system parameters $\theta_o$, $\theta_d$ and $\theta_i$ to directly optimize the performance metric, possibly subject to certain constraints on the costs 270. For example, an image-based post-processing performance metric 290 may be optimized subject to a maximum financial cost. Alternately, the financial cost may be minimized subject to some minimum acceptable post-processing performance metric 290 for the digital image 280.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 2 and 4, there is no requirement for the optical subsystem 210, the detector subsystem 220 or the digital image processing subsystem 230, taken alone, to be optimal.

The following descriptions provide further examples of models of the source 250, optical subsystem 210, detector subsystem 220 and digital image processing subsystem 230. One specific model (but not the only model) is described, thereby presenting a unified framework for end-to-end performance evaluation.

Beginning with the source 250, the design method of FIG. 4 includes a spatial model of the source 250 when possible. In most scenarios, the universe of all possible source objects to be imaged is naturally constrained by the application. For instance, this universe of objects may be tightly constrained as in the case of a bar code reading system, or rather unconstrained as in the case of a general purpose consumer camera. Be it large or small, the boundedness of this space can offer important prior information for the system designer. For instance, knowing that the source is a binary level scanned document provides powerful constraints and information to the digital image processing subsystem in particular.

In one approach, suppose that there exists a three-dimensional source luminance function, $s_{obj}(x', y', z', \lambda)$, which results from the complex interaction between three-dimensional scene geometry, reflectance, and illumination. In this simplified spatial model, assume that the signal represents the radiant intensity of incoherent light with wavelength $\lambda$ emanating from points in the three dimensional space defined by (x', y', z'). The purpose of the electro-optic imaging system 200 is to capture the two-dimensional projection of this source signal.

In one embodiment, the post-processing performance metric 290 is based on a comparison of the actual (or simulated) image 280 to some ideal image 255. The ideal image 255 can be modeled in different ways, one of which is presented below. In this example, the idealized forward model at wavelength $\lambda$ can be modeled as $$s_{ideal}[m, n, \lambda] = [B_T(x, y) * \qquad (1)$$
$$P(s_{obj}(x', y', z', \lambda))] \mid x = Tm, y = Tn$$
$$= [B_T(x, y) * s_{proj}(x, y, \lambda)] \mid x = Tm, y = Tn$$
$$= [s_{img}(x, y, \lambda)] \mid x = Tm, y = Tn$$

where P(•) represents the ideal projective (pinhole) transformation into the image coordinate space (x, y) and $B_T(•)$ is an ideal bandpass filter with cutoff frequency matched to the spatial sampling period T. The indices (m, n) represent the indices of the pixel locations of the final sampled image.

Because the ideal image $s_{ideal}$ 255 is the goal for the imaging system 200, the effects of the subsystems are formulated in terms of their effect on the idealized image $s_{ideal}(m, n, \lambda)$. As such, this model distinguishes between the source function s in the three-dimensional object space $s_{obj}$, after being projected onto the image plane $s_{proj}$, after passing through some idealized optics $s_{img}$ and after being sampled $s_{ideal}$. It is often convenient to represent the ordered collection of the samples $s_{ideal}$ by the vector s.

Figure 5:
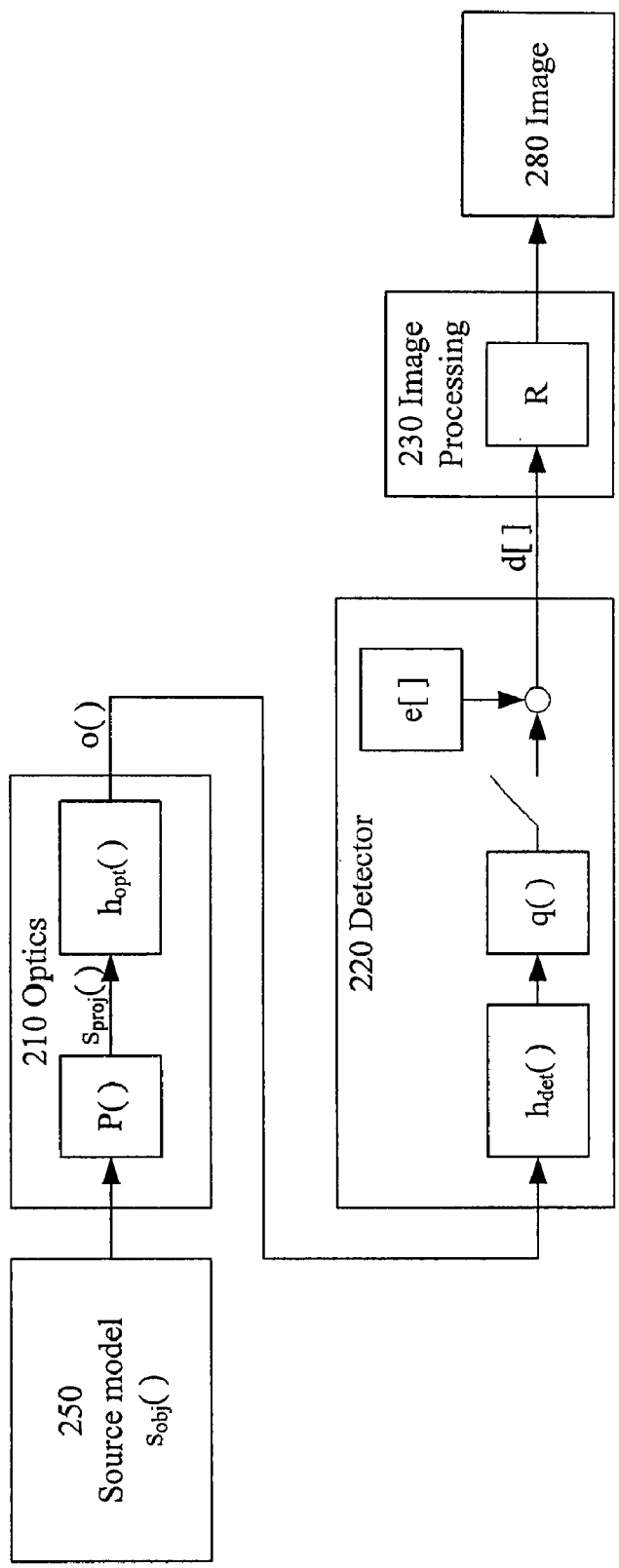
FIG. 5 is a block diagram of a model of an electro-optic imaging system.

Moving now to the actual image 280, FIG. 5 is a block diagram of a model of the electro-optic imaging system that produces the actual image 280. Information used to produce the spatial model of the source 250 may take several forms. For example, the designer may possess detailed information about the three-dimensional geometry of the scene under consideration. The spatially varying luminance properties of the scene may also be used to model the source 250. For instance, when dealing with text or textual document images, the designer may have information relating to the language of the imaged text, or that the signal represents a binary source, etc. In one approach, the information about the source signal is assumed to be statistical in nature and is modeled by a power spectral density function. Such information might be extracted from a corpus of objects representative of the sources to be imaged by the fielded system or modeled from physical first principles. This knowledge can be especially useful in designing the digital image processing subsystem. Many image processing techniques rely on prior information regarding the contents of the scene under observation as imaged by an idealized imaging system.

Moving now to the optical subsystem 210, for a particular wavelength of light $\lambda$ the forward optical imaging model can be expressed as $$o(x,y) = \int h_{opt}(x,y,\tilde{x},\tilde{y}) s_{img}(x,y) d\tilde{x} d\tilde{y} \quad (2)$$

where o(x, y) is the optical image after the ideal projected optical image $s_{img}(x, y)$ (produced by the projective transformation P( )) is blurred by the spatially varying point spread function (PSF) $h_{opt}(x, y, \tilde{x}, \tilde{y})$. The digital image d[m, n] after being sensed by the photodetector 220 is given by $$d[m,n] = q(\int h_{det}(x-\tilde{x},y-\tilde{y}) o(x,y) d\tilde{x} d\tilde{y})|_{x=Tm, y=Tn} + e[m,n] \quad (3)$$

where $h_{det}(x, y)$ is the spatially invariant detector integration function, T is the pixel separation or spatial sampling rate, q( ) is the quantization associated with the detector, and e[m, n] is the random noise associated with the detection process.

This forward model can be approximated by the linear model $$d = Hs + e \quad (4)$$

where s is the vector of samples of the bandlimited input image $s_{ideal}[m, n]$, H is the matrix representing the cumulative effects of both the optical point spread function $h_{opt}(x, y, \tilde{x}, \tilde{y})$ and the sensor integration function $h_{det}(x, y)$, and e represents the additive random noise due to the detector. The units m and n represent the indices after sampling. The form of Eqn. 4 is useful primarily as a simplified representation. The actual simulation need not explicitly construct such matrices.

The effects of the digital image processing subsystem 230 are also modeled. In this example, the image processing is constrained to be linear, where the final image is thus given by $$\hat{s} = R d \quad (5)$$

where R is the matrix describing the linear image processing.

Eqn. 5 was developed for a single wavelength. This is adequate for monochromatic systems which operate at a single wavelength. For systems which operate over a wavelength band but only produce a single output signal, the equations developed above can be integrated over the wavelength band. The monochromatic model can be extended to color imaging systems (i.e., systems which produce more than one output signal—for example separate R, G and B signals) in a number of different ways. The color images can be computed as $$d(l) = H(l) s(l) + e(l) \quad (6)$$

where the index l indicated different color bands and the quantities may be integrated over the wavelength band of interest, including for example the wavelength sensitivity of the photodetector. In one approach, each color band is designed separately with respect to the digital image processing subsystem. Each color image d(l) is processed by its own wavelength-dependent digital filter R(l), which can be different for different color bands. Thus, each color channel can be optimized with some independence. In an alternate approach, a single wavelength-independent digital filter R is applied to all color channels. For convenience, the remaining disclosure addresses the monochromatic case, with the understanding that this can be extended to polychromatic systems.

Figure 6:
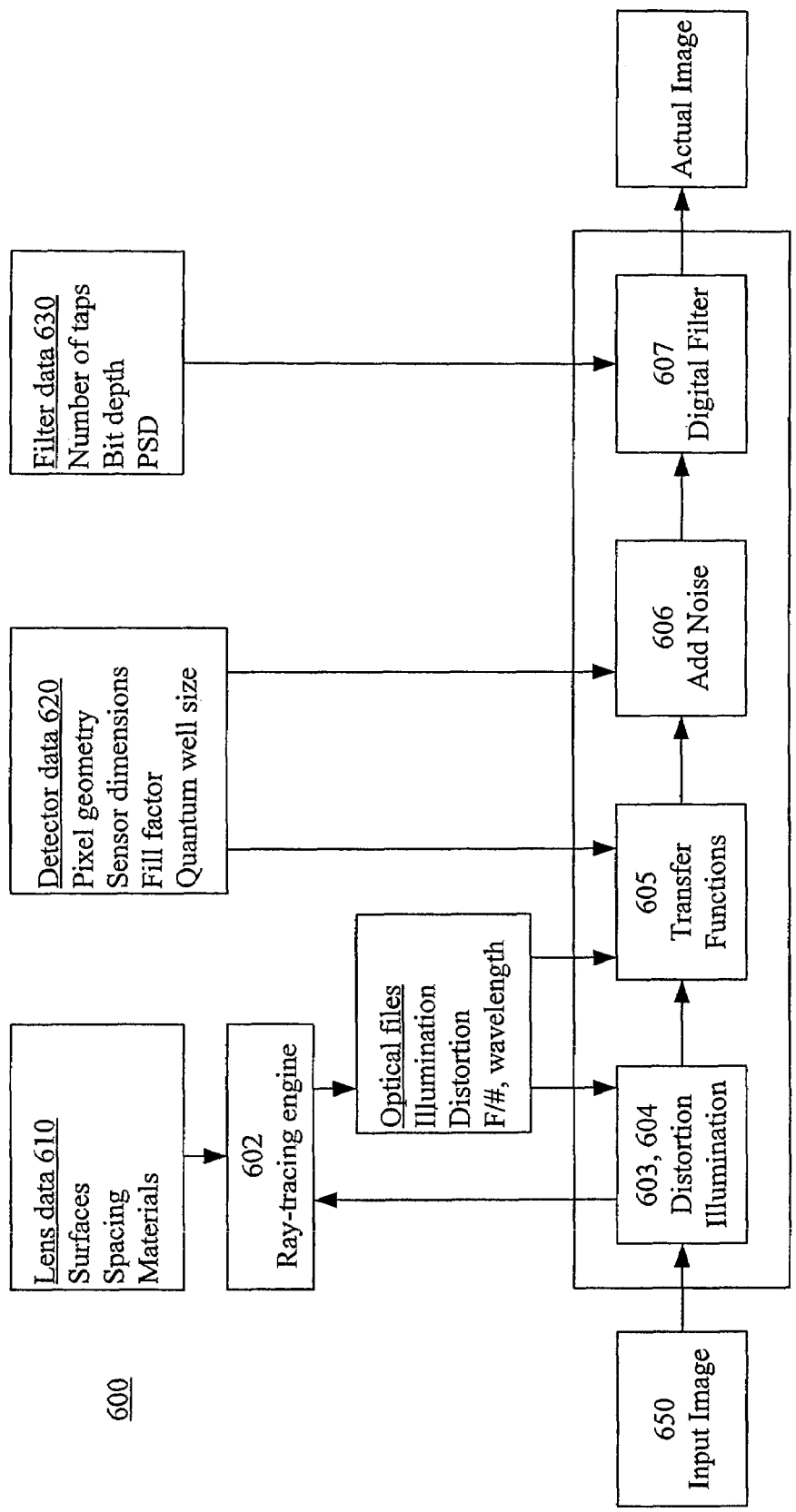
FIG. 6 is a block diagram of one software implementation of the model of FIG. 5.

FIG. 6 is a block diagram of a software architecture for implementing the propagation model shown in FIG. 5 and Eqns. 4-6 above. The software 600 takes the following inputs:
 a. input image file 650 describing the input image s 250
 b. lens design file 610 describing the optical subsystem 210
 c. detector file 620 describing the detector subsystem 220
 d. filter file 630 describing the digital filter 230

These are shown as separate files for convenience but the information may come in different forms and file formats. The software 600 includes modules for the following functions: ray tracing 602, distortion 603, illumination (e.g., vignetting) 604, transfer functions/point spread functions 605, noise 606, and digital filtering 607.

The software 600 operates as follows. The ray tracing engine 602 ray traces the optical subsystem specified in the lens design file 610 to compute the optical properties needed to compute the matrix H. Modules 603-406 apply this model to the source s specified in input image file 650 to produce the sensed image d. Module 607 applies the linear digital filter R to produce the final output image $\hat{s}$.

For large images, explicitly constructing the matrices H and R may be unfeasible. Various simplifications can be used to improve the computational efficiency. For example, the optical effects of illumination variation (e.g., vignetting) and distortion can be separated from those related to blurring. In both the forward optical model as well as the image processing model, these affects are applied sequentially. For example, the optical channel matrix H can be separated into the three components $$H = H_{blur} H_{illum} H_{dist} \quad (7)$$

where $H_{blur}$ captures the convolution of the image with the optical/sensor PSF (implemented by module 605), $H_{illum}$ is a diagonal matrix capturing the illumination change over the image field due to vignetting (module 604), and $H_{dist}$ represents the image warping due to optical distortion (module 603). In addition, the spatially-variant PSF $h_{opt}(x, y, \tilde{x}, \tilde{y})$ can be approximated as piecewise invariant. The image space is divided into tiles, each covering a certain area in $(\tilde{x}, \tilde{y})$ space, and the PSF is modeled as spatially invariant within each tile. Thus, the overall PSF is modeled by a set of spatially-invariant point spread functions $h_{opt}(x, y, u)$ where the u identifies the area over which that spatially invariant PSF applies. This approach supports convolution in the frequency domain in an efficient manner using the Fast Fourier Transform (FFT).

In more detail, consider first the optical distortion $H_{dist}$. The ray tracing engine 602 determines the geometrical distortion in the lens design, which is a mapping between paraxial (undistorted) image coordinates and actual (with distortion) image coordinates. Note that the detector is located in actual image space but the undistorted image $s_{ideal}$ is located in paraxial image space because it is a geometrical projection assuming no distortion. To account for this, module 603 distorts the image $s_{ideal}$ so that the points (mT, nT) in the distorted version of $s_{ideal}$ are the actual points in the undistorted version of $s_{ideal}$ that would fall on detector[m, n]. Explained in another way, the actual image is laid out in a regular grid with respect to the distorted image coordinates (mT, nT). The software determines the undistorted coordinates corresponding to this set of actual distorted coordinates.

In one approach, the distortion mapping from paraxial coordinates to actual coordinates is approximated as a cubic function. Furthermore, the distortion is assumed to be small so that the inverse mapping can also be modeled as a cubic (as opposed to strictly inverting the cubic). Other approaches can also be used. For example, the distortion mapping function can be represented by sample points and then interpolated to get the inverse mapping. This mapping is then used to construct $H_{dist}$. The rows of the matrix $H_{dist}$ are comprised of the coefficients of the linear interpolation kernel. The coefficients are defined by the distance between the desired sample location and the actual sample locations in $s_{ideal}$.

Vignetting and other illumination effects are accounted for by $H_{illum}$. In image space, these illumination effects manifest themselves as a spatially varying gain factor, which can be implemented as the diagonal matrix $H_{illum}$. The actual gains are determined by the ray tracing engine 602. In one approach, the gain factor is modeled as a rotationally symmetric polynomial (i.e., a polynomial in radius r).

$H_{blur}$ accounts for the spatially varying blur or point spread function (PSF) associated with the optics and the photo-detector. The blurring operation is the combination of both the blurring due to the optical system $h_{opt}(x, y, \tilde{x}, \tilde{y})$ as well as the spatial integration due to the geometry of photo-detector pixels $h_{det}(x, y)$. While the blurring of the photo-detector is spatially-invariant, the blurring of the optics typically is a field-dependent characteristic. To simulate the full imaging system to a high accuracy, this spatially varying PSF must be accurately modeled. Unfortunately, explicitly computing and applying a different PSF for each pixel usually is computationally infeasible.

In an alternate approach, the spatially varying point spread function PSF $h_{opt}(x, y, \tilde{x}, \tilde{y})$ is approximated by a PSF composed of tiles within which the PSF is approximated as spatially invariant. In one implementation, each tile, defined by index u, is a square having dimensions D×D pixels. By approximating the PSF with spatially-invariant tiles, the blurring operation can be efficiently implemented in the frequency domain using FFTs rather than performing explicit spatial-domain convolution. Each D×D image tile is padded with ±P pixels of image data creating a larger image tile of dimension B×B. At the edges of the input image, the padding takes the form of reflected image data. This image tile is converted into the frequency domain using an FFT and multiplied by the total transfer function (TTF) $H_{blur}(u)$ for this particular tile u. After an inverse FFT, the blurred image data is written to the output image at the tile indices u.

The tile size D is an input parameter to the simulation. Smaller D improves the accuracy of the tile-based approximation to the spatially varying PSF at the expense of increased computational complexity. The amount of padding P needed to prevent tiling artifacts in the tile-based approximation is also an input parameter to the simulation. The amount of padding typically should be at least as large as the PSF. In general, the PSF for an optical system typically is not very large in size. This padding, however, becomes important when performing subsequent image processing where the digital filters may be large in spatial extent. If P is too small, tiling artifacts will dramatically reduce the accuracy of the tile-based approximation to the spatially varying process.

The total transfer function mentioned above is the transfer function taking into account both the optical subsystem and the detector subsystem. In this application, the total transfer function is also referred to as the imaging MTF.

Turning now to the noise module 606, in one approach, the noise is modeled as an additive Gaussian noise. In one model, the additive noise is assumed to be white Gaussian noise with variance $\sigma^2$ independent of the (x, y) position. The noise power or variance is entered as a simulation parameter by way of the noise power spectral density function (PSD). The PSD may be used to correlate or shape the noise. Alternately, the noise can be modeled using a random number generator.

In an alternate model, the additive Gaussian noise has a variance which is spatially varying and depends on the gray level associated with the particular pixel. In this case, Gaussian noise statistics are used to simulate photon noise in a high-photon regime. The noise variance for a particular pixel is given by $$\sigma^2[m, n] = s[m, n]\frac{2^b}{Q} \qquad (8)$$

where s[m, n] is the simulated sampled image after accounting for distortion, relative illumination, and blurring, b is the bit depth of the detector (6, 8, 12, etc.), and Q is the quantum well size for a particular pixel. Both b and Q are inputs to the simulation software. Thus, as the size of the quantum well of the detector increases, the shot noise power is decreased and vice-versa.

Moving to module 607, the digital image processing effects can also contain multiple stages: deblurring, distortion compensation and spatial equalization, for example. In this example, the observed image is first deblurred using spatially varying digital filters. Then, distortion compensation and spatial equalization are applied.

Deblurring is achieved using the same segmented approach described previously for the PSF. The image space is divided into filter domains and the digital filter is spatially invariant within each filter domain. That is, the same filter kernel R[ω, v, u] is applied to all image points within the filter domain. Here, [ω, v] are the spatial frequency indices and u indicates the filter domain. In one approach, the digital filter for a particular domain is $$R_{blur}[\omega, v, u] = \frac{H^*[\omega, v, u]S[\omega, v]}{|H[\omega, v, u]|^2 S[\omega, v] + E[\omega, v]} \qquad (9)$$

where H[ω, v, u] is the TTF for the uth filter domain, S[ω, v] is the power spectral density (PSD) for the source image, and E[ω, v] is the PSD for the noise.

The techniques described above can be used to calculate the ideal image s 255 (see Eqn. 1) and the actual image ŝ 280 (see Eqn. 5). Referring to FIG. 2, a performance metric 290 is calculated comparing the ideal image and actual image. Different performance metrics can be used.

One performance metric is the RMSE between the ideal image $s_{ideal}[m, n, \lambda]$ and the (simulated) actual images $\hat{s}[m, n, \lambda]$, which is given by $$RMSE = \sqrt{\frac{1}{N}\sum_{i} \|s(\lambda_i) - \hat{s}(\lambda_i)\|^2} \quad (10)$$

where N is the total number of pixels in the images for all color channels combined and $\lambda_i$ indicates different color channels.

FIG. 6 and the above discussion illustrated one approach for software modeling of propagation of the source through the electro-optic imaging system. This software 600 has the capability to analyze the digital image 280 and/or RMSE associated with a particular optical design 610 and digital filter design 630.

In this example, the design optimization is implemented as follows. The image field is divided into U tiles. Increasing the number of tiles increases the accuracy of the optimization but can slow down the computational speed of the optimization. Symmetry can be used to reduce the computational burden. To predict the RMSE performance, the total transfer function (TTF) is computed for different tiles, as described above. As before, information about the OPD sampling resolution, tile size, detector properties and PSD images are stored in separate files which are accessed by the software. The OPD functions produced during optimization differ in one respect from those produced during simulation. In this implementation, the OPD functions produced for optimization have the tilt removed. Removing the tilt essentially ignores the line-of-sight errors introduced by the optics, on the assumption that, for the most part, such shift errors can be corrected with image processing. This particular implementation is more focused on the resolution degradation due to spatial blurring.

For each tile, the MSE is calculated assuming that the tile is filtered using the appropriate Wiener filter. To reduce computations, the MSE in this case can be predicted without having to explicitly compute the Wiener filter. For any particular tile, the predicted MSE is given by $$MSE_{pred}(u) = \frac{1}{B^2}\sum_{\omega,v} \frac{S[\omega, v]E[\omega, v]}{|H[\omega, v, u]|^2 S[\omega, v] + E[\omega, v]} \quad (12)$$

where the PSD images are B×B pixels in size The TTF H[ω, v, u] is scaled to match the PSD image sizes. Once the predicted MSE is computed for each of the field locations, the overall RMSE for one particular configuration is predicted by $$RMSE_{pred} = \sqrt{\frac{1}{U}\sum_{u} MSE_{pred}(u)} \quad (13)$$

These error measures can be combined for different configurations (e.g., the optical subsystem combined with different detector subsystems) to obtain the overall performance metric 290, which is then passed to an optimization module, which uses its own internal searching routines to optimize the optical design based directly on the post-processing performance metric. Eqn. 12 assumes a one to one correspondence between filter domains and tiles.

In the above formulation, Eqn. 12 in effect ignores the signal content above the Nyquist frequencies. Optimizing the performance measure based on Eqn. 12 will maximize the performance of the electro-optic imaging system provided that signal content above the Nyquist rate is minimal. However, in most imaging scenarios, this is difficult to guarantee.

Therefore, it is advantageous to incorporate the effects of aliasing into the optimization framework. Several researchers have noted that aliasing artifacts appear to have noise-like statistical properties within the sampling band. One common modeling approach considers the aliasing artifacts as a noise source with a power spectral density (PSD) of $$E_A(\omega, v) = \frac{1}{A^2}\sum_{a=1, b=2}^{A} |H(\omega - a\omega_N, v - bv_N)|^2 \quad (14)$$
$$S(\omega - a\omega_N, v - bv_N)$$

Eqn. 14 can be interpreted as the portion of the signal PSD that is folded back into the sampling band after being weighted by the overall system transfer function. The aliasing noise PSD is a function of both the system transfer function and the source PSD. To compute the aliasing noise PSD using Eqn. 14, a model of the signal PSD above the sampling rate is required.

This PSD could be derived in a number of ways. For the following, a particular model of the image PSD is fit to a database of training images. In particular, for this example, the PSD is described in polar coordinates as $$S(\omega, v) = S(\theta, \rho) = \frac{\alpha(\theta)}{|\rho|^{\beta(\theta)}} \quad (15)$$

where θ is the angular coordinate and ρ is the radial distance coordinate. In the following simulations, a database of several hundred images is used to estimate the α and β parameters for 40 evenly spaced angular bins $\theta_i$.

Having determined an aliasing noise PSD, the approach described above can be adapted to account for aliasing noise by using the sum of the detector noise PSD and the aliasing noise PSD $E_A(\omega,v)$ as the overall noise PSD $E(\omega,v)$ in the optimizations.

$$E(\omega,v) = E_A(\omega,v) + E_D(\omega,v) \quad (16)$$

A merit function based on the predicted MSE of Eqn. 12 which uses the noise PSD $E(\omega,v)$ shown in Eqn. 16 will tend to try and maximize the system transfer function within the sampling band while at the same time trying to minimize the system transfer function outside the sampling band. In addition, the optimization will tend to find the best balance between the two where digital image processing is matched to provide the optimal smoothing and sharpening of the final image.

The following is an example design for a monochromatic triplet lens system with the following properties:

focal length: 35 mm field angle: ±20 degrees
BK7 glass
wavelength: 550 nm
F#:5.0

There are 12 optical design parameters or degrees of freedom: 6 surface curvatures, 3 lens thicknesses, 2 inter-lens spacings (distances) and 1 back focal distance.

This particular lens system was selected as an example due to the relative simplicity with which a nearly diffraction limited resolution can be designed. The design parameters of a traditional system which achieve nearly diffraction-limited resolution are shown in Table 1. This lens system has an average of 0.06 waves of OPD-RMS error over the field of view. However, a standard birefringent plate is used as a discrete optical low pass filter in order to reduce aliasing. If the lens system is intended to be used with detectors of different pitches, a complete set of birefringent plates is required to accommodate the different pitch detectors additional elements. In this example, the detector pitch, and hence the detector sampling frequency, ranges from 4 μm pixels to 15 μm pixels. For the given field of view, this corresponds to an 8 Megapixel (Mp) sensor down to a VGA resolution sensor.

The design was conducted using optimization based on the RMSE merit function described above (using the noise PSD of Eqn. 16) in conjunction with a multiple configuration Zemax optical system (to optimize over the adjustment). The multiple configurations corresponded to pixel sizes of 4 μm, 6 μm, 9 μm, 12 μm, and 15 μm pixels which have corresponding undersampling factors of A=3.0, 4.6, 6.8, 9.1 and 11.4 respectively. The sensor fill factor is set to 50% for purposes of the optimization, although the performance of the lenses system is evaluated for a wider range of fill factors.

The resulting design has the design parameters shown in Table 2.

TABLE 2

Design Parameters for Triplet with Adjustable Optical Cutoff Frequency

| Surface | Radii (mm) | Thickness (mm) | 4 μm | 6 μm | 9 μm | 12 μm | 15 μm |
| --- | --- | --- | --- | --- | --- | --- | --- |
| 1 | 11.644 | 6.951 | — | — | — | — | — |
| 2 | 5.948 | — | 3.297 | 3.295 | 3.380 | 3.299 | 3.308 |
| 3 | 9.801 | 2.854 | — | — | — | — | — |
| 4 | 9.398 | — | 5.178 | 5.176 | 5.141 | 5.276 | 5.267 |
| 5 | −145.948 | 3.945 | — | — | — | — | — |
| 6 | −9.469 | — | 35.246 | 35.239 | 35.158 | 35.079 | 35.072 |

TABLE 1

Design Parameters for Diffraction-Limited Triplet

| Surface | Radii (mm) | Thickness (mm) |
| --- | --- | --- |
| 1 | 12.543 | 7.8970 |
| 2 | 6.017 | 3.2945 |
| 3 | 10.205 | 3.3990 |
| 4 | 9.634 | 5.1764 |
| 5 | −372.609 | 3.4794 |
| 6 | −9.412 | 35.2447 |

In accordance with the invention, the use of the standard birefringent plate low pass filter is eliminated. Instead, the lens system itself is designed to implement the low pass filtering. It is the cumulative effect of the different lenses that achieves the low pass filtering. There is not a separate, discrete component that can be identified as the low pass filter (such as a birefringent plate). Rather, the low pass filter is implemented in an integrated fashion among the different lenses. Furthermore, the lens system can be adjusted to implement different cutoff frequencies, thus allowing the same lens system to be used with different pitch detectors.

Figure 7:
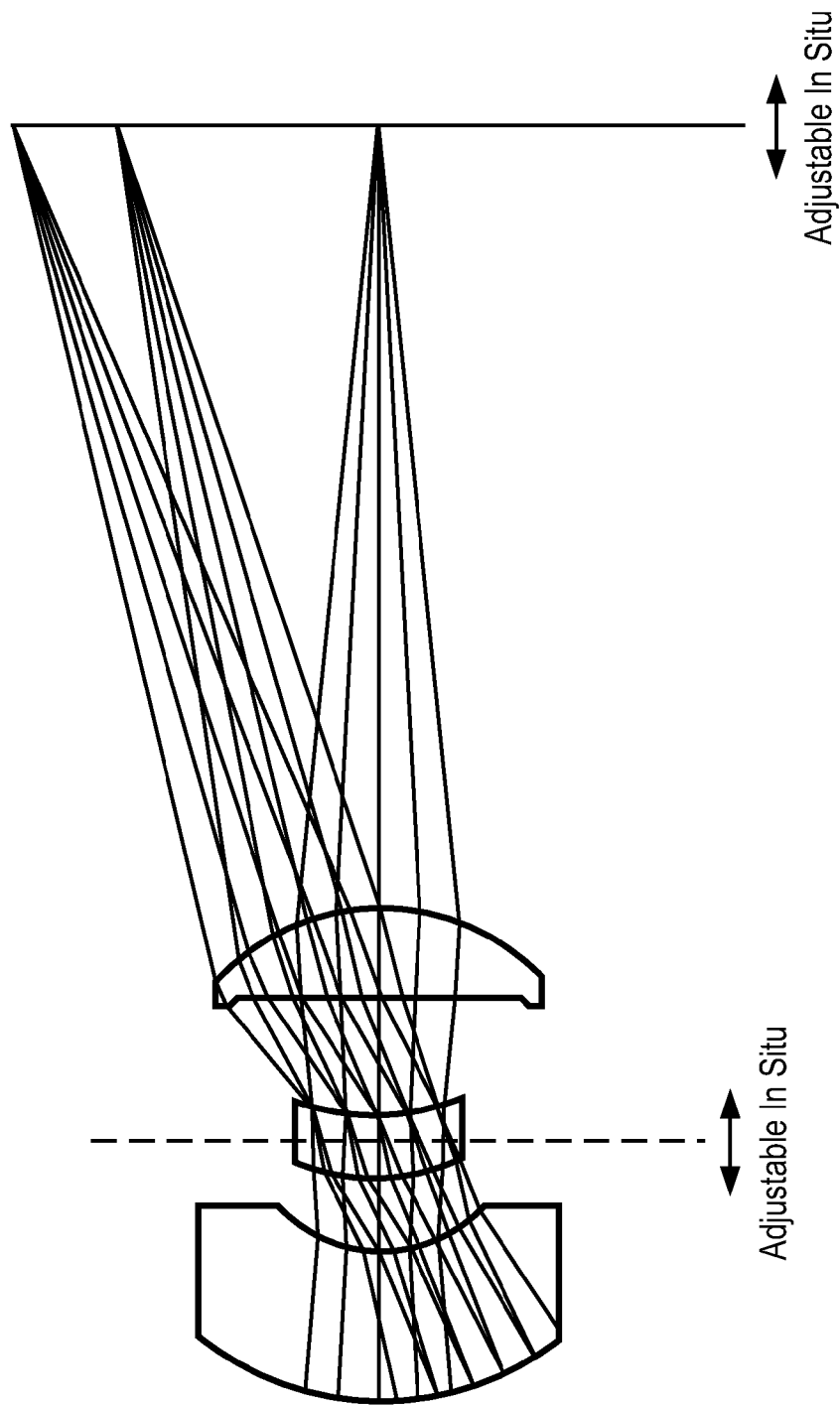
FIG. 7 is a diagram illustrating a triplet with adjustable optical cutoff frequency.
Figure 8A:
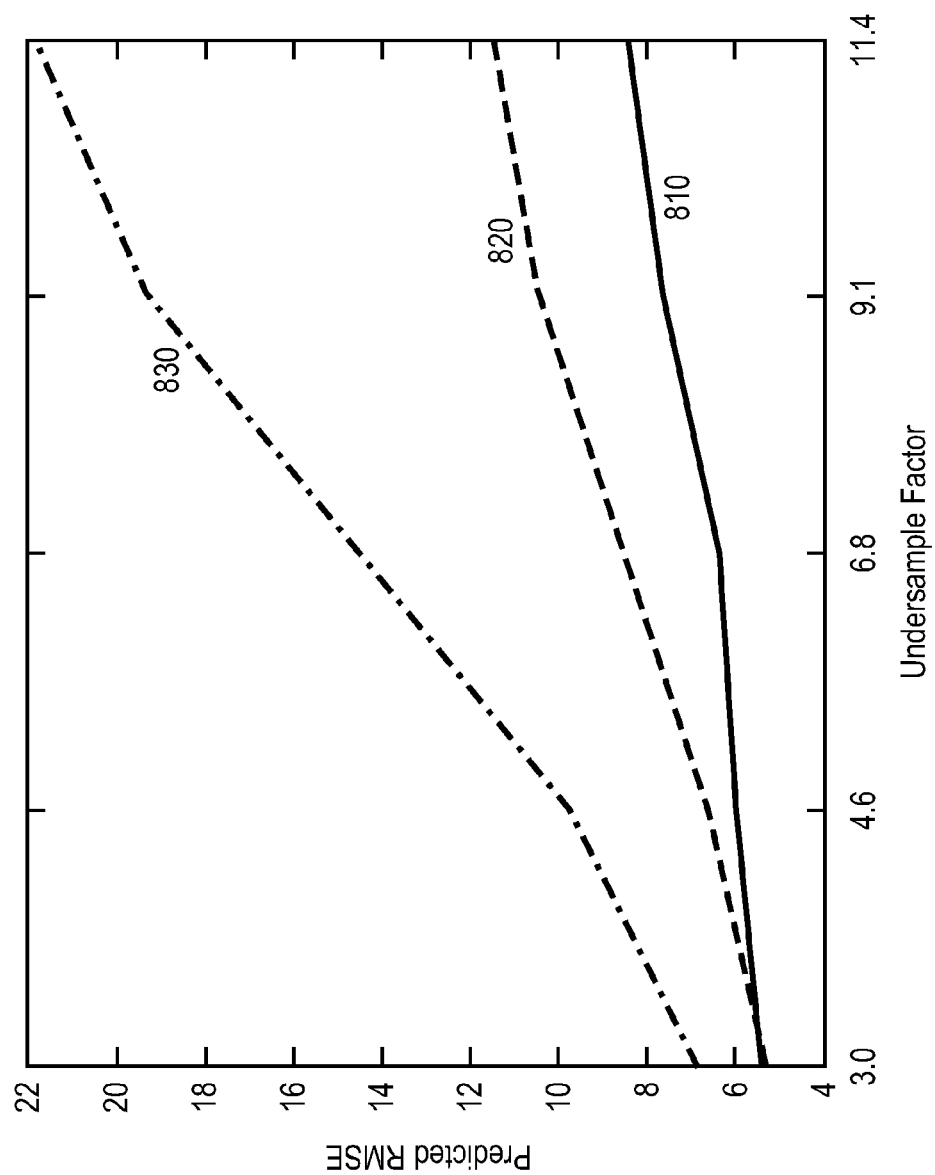
FIGS. 8A-8B are graphs of RMSE as a function of the undersampling factor A.
Figure 8B:
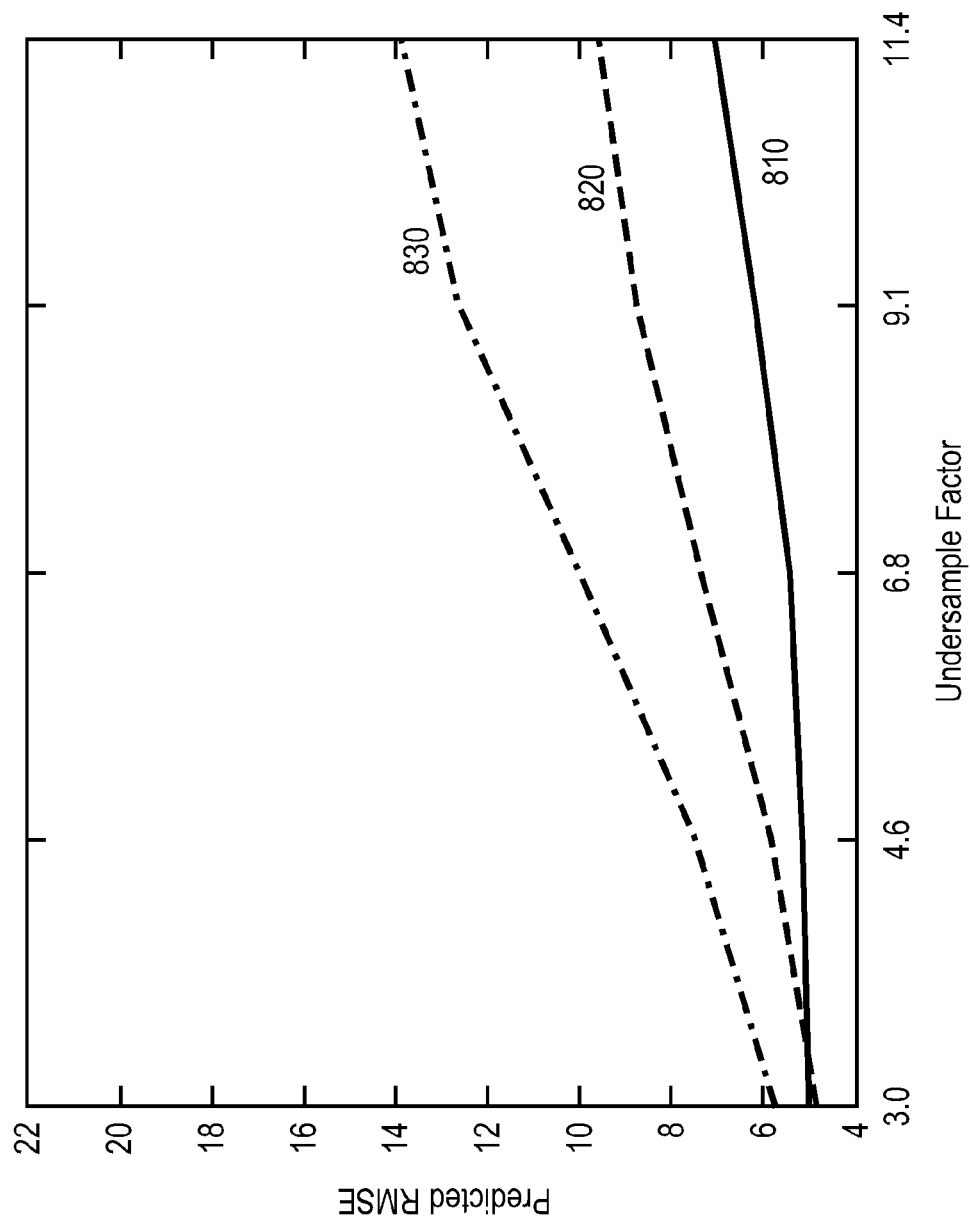

Anther formulation of this design problem is to design a lens system which adjusts the optical cutoff frequency depending on the undersampling factor A (ratio of the diffraction-limited cutoff frequency to the detector sampling frequency In this example, the lens system is adjusted by moving the center element of the triplet lens system to shift along the optical axis. The back focus of the lens is also allowed to shift to maximize the image sharpness while minimizing aliasing artifacts. FIG. 7 shows a schematic of the optical component and design parameters for this design problem. Note that the optical low-pass filtering is accomplished without adding any FIGS. 8A and 8B compare the performance of the traditional diffraction-limited triplet and the adjustable cutoff triplet, based on the predicted RMSE using Eqn. 12 using the aliasing noise PSD model described in Eqn. 16. Curve 810 plots the RMSE of the adjustable cutoff triplet. Curve 820 plots the RMSE of the traditional triplet with a birefringent optical low pass filter (which is selected in each instance to match the individual pixel size). Curve 830 plots the RMSE of the traditional triplet without a birefringent optical low pass filter. In FIG. 8A, the fill factor is 40%. In FIG. 8B, the fill factor is 80%. The adjustable cutoff triplet performs better than either of the traditional triplets over the range of undersampling factors (pixel sizes). Not only does the adjustable cutoff triplet have a lower RMSE, but it also achieves this performance without an additional, separate optical low pass filter component. Thus, the adjustable cutoff triplet provides better performance at a lower cost.

Figure 9A:
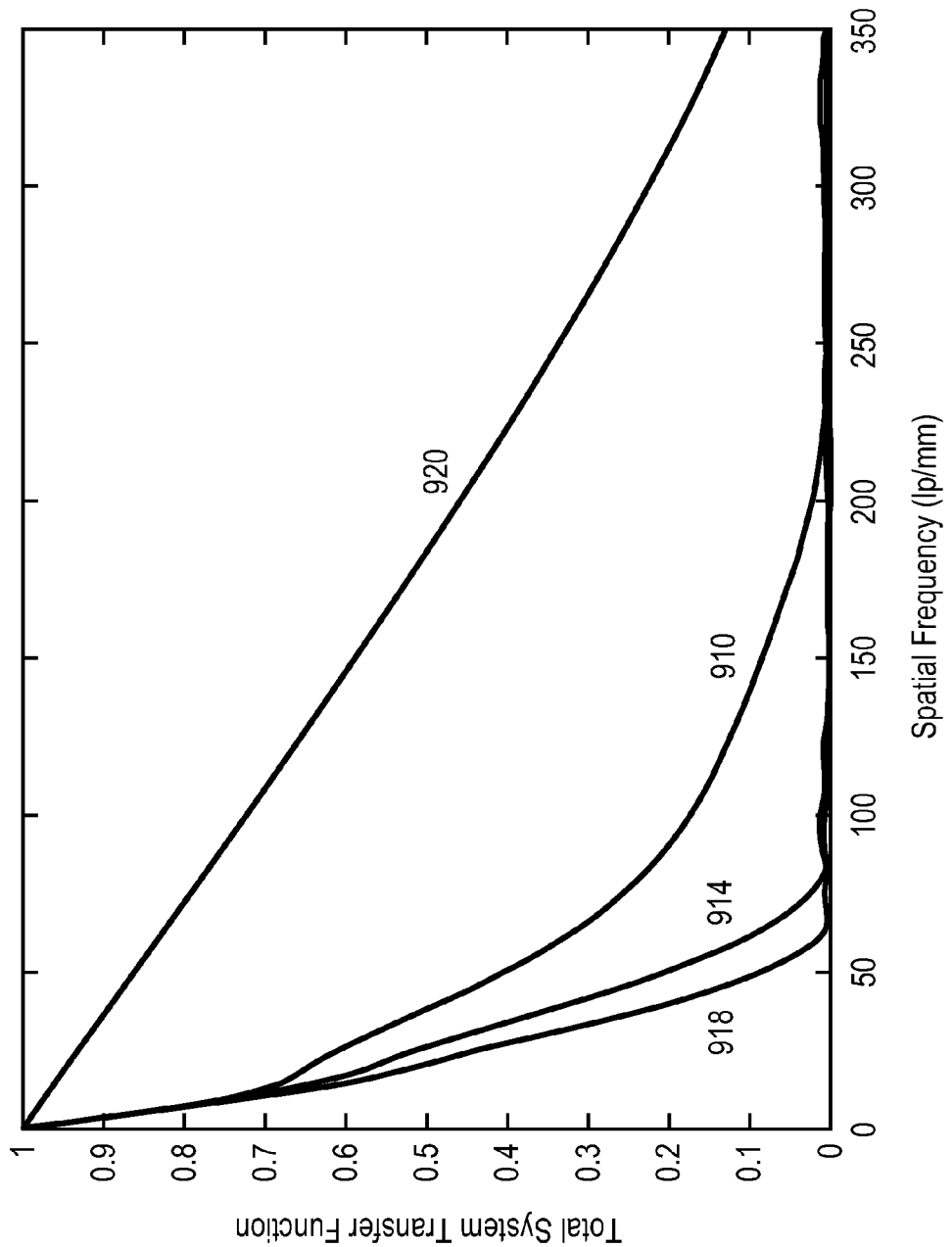
FIGS. 9A-9B are graphs of the total transfer function of an electro-optic imaging system according to the invention.
Figure 9B:
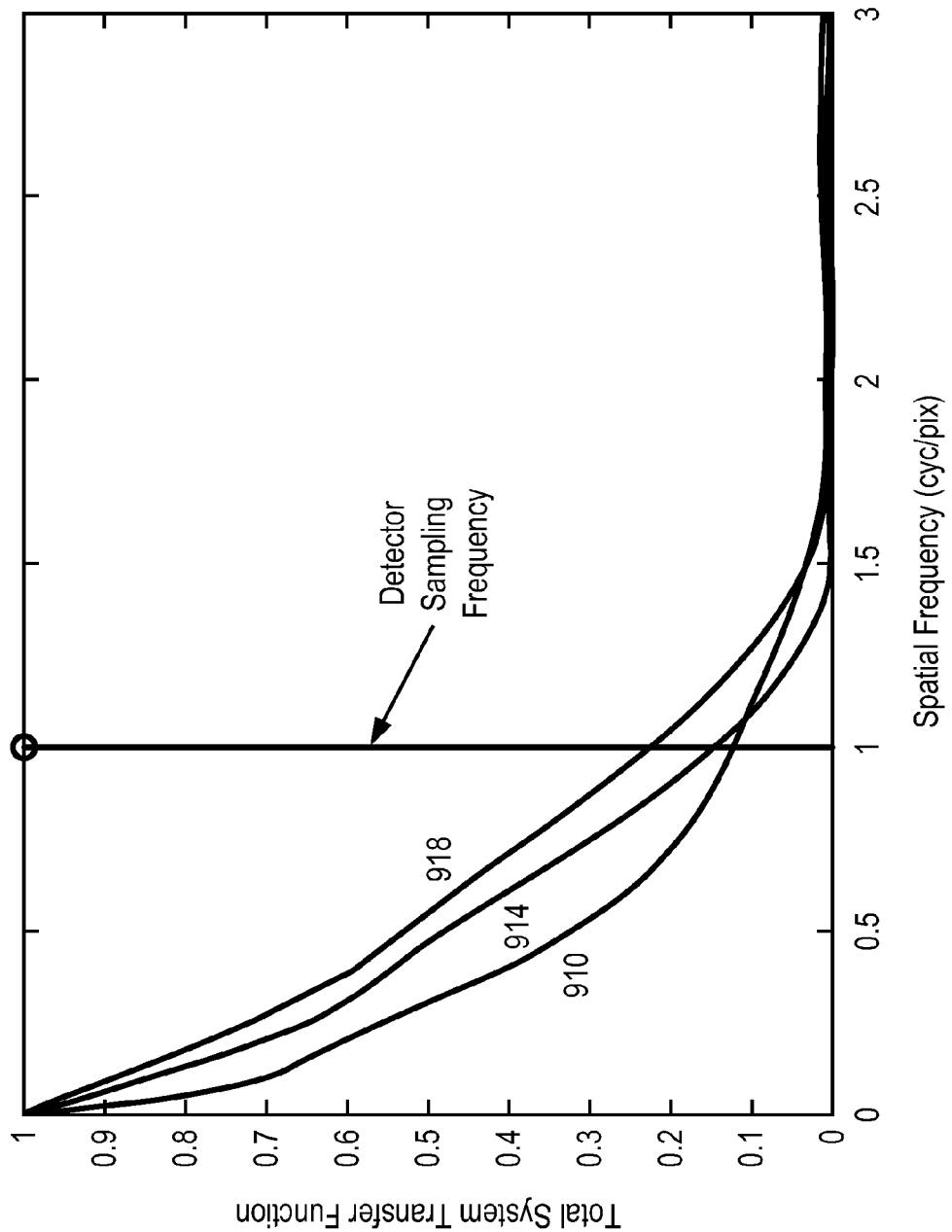

FIGS. 9A-9B are graphs of the imaging MTF of an electro-optic imaging system according to the invention. FIG. 9A shows the imaging MTFs (or total transfer function) 910, 914, 918 for pixel pitches of 4, 9 and 15 μm. The diffraction limited optical MTF 920 is shown for comparison. FIG. 9B shows the same curves 910, 914 and 918, but the spatial frequency axis has been normalized by the detector sampling frequency. The passing of frequencies within the sampling band and attenuation of frequencies above the sampling band is evident.

Figure 10A:
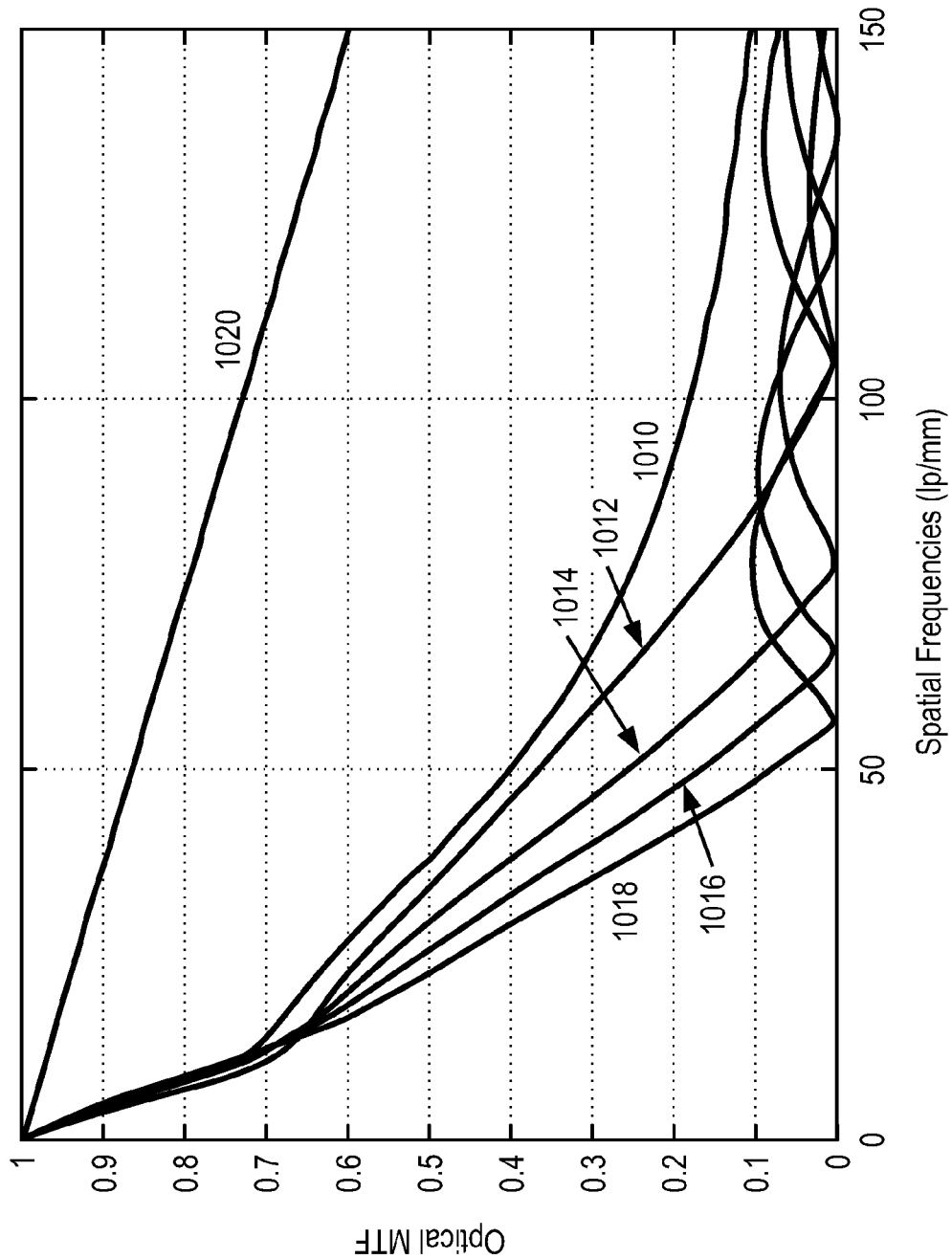
FIGS. 10A-10B are graphs of the optical MTF of another electro-optic imaging system according to the invention.
Figure 10B:
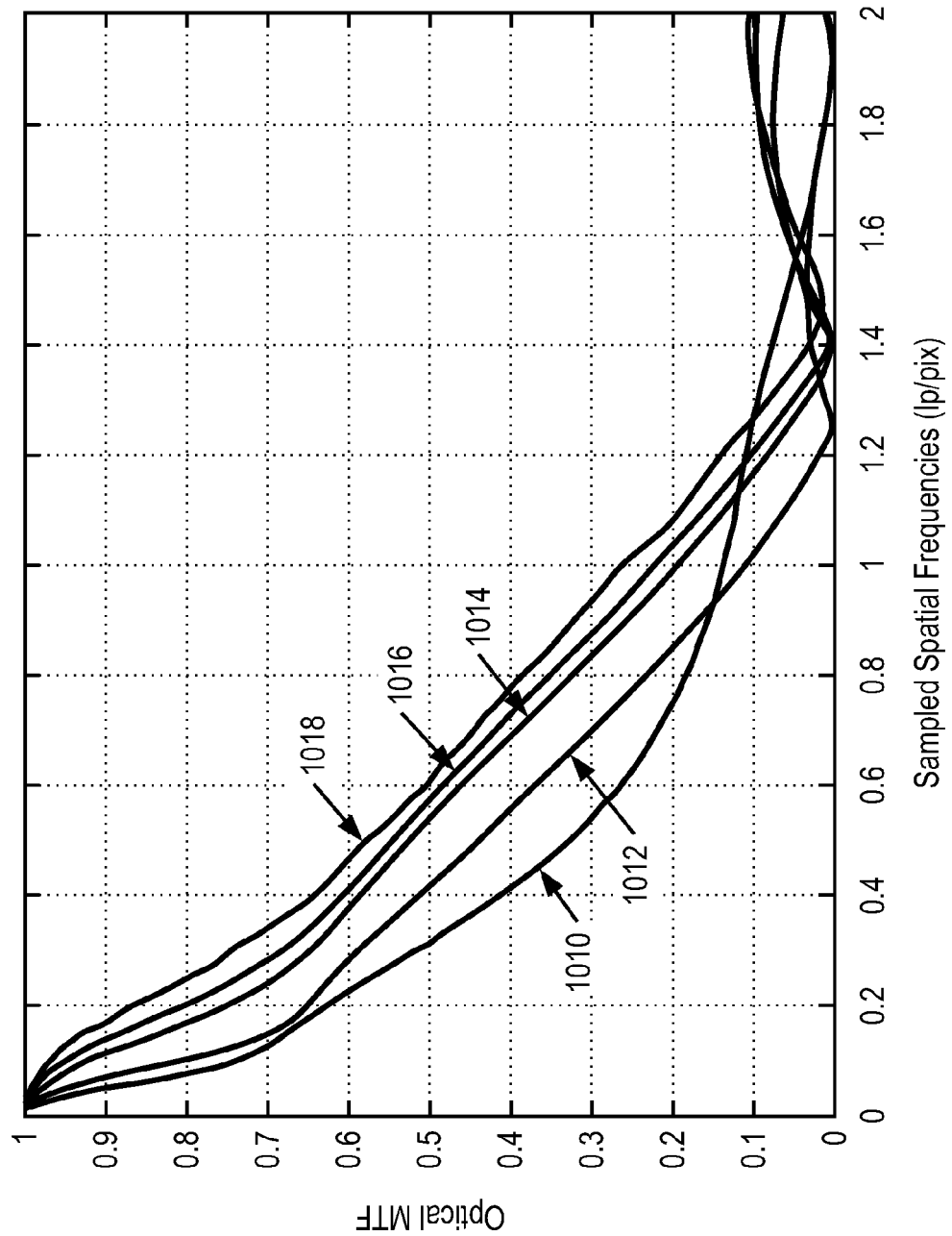
Figure 10C:
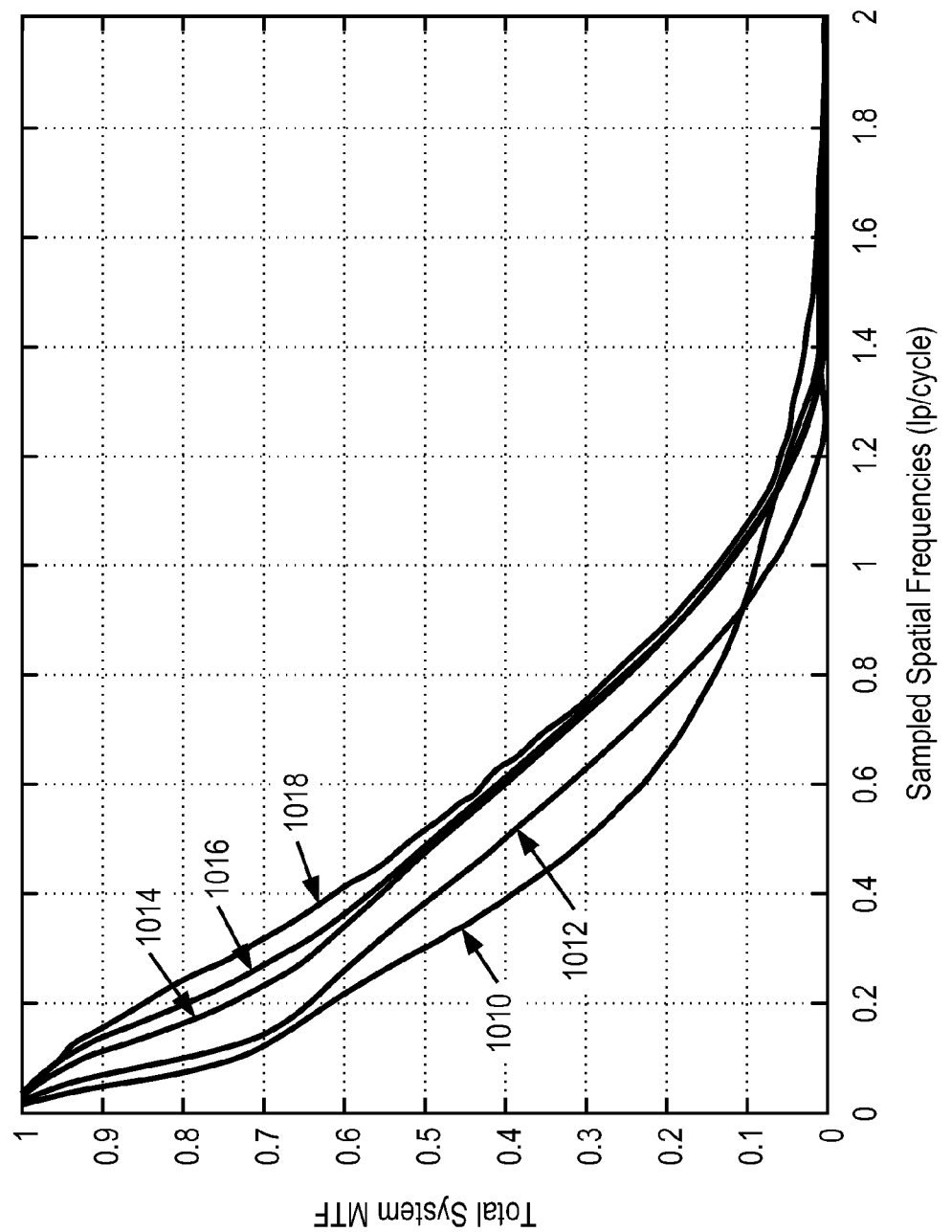
FIG. 10C is a graph of the total transfer function of the electro-optic imaging system of FIGS. 10A-10B.

Table 3 and FIGS. 10A-10C describe another example. In this example, the lens materials are BK7, F2 and BK7, respectively. FIGS. 10A-10B show the optical MTFs 1010-1018 for pixel pitches of 4, 6, 9, 12 and 15 μm, respectively. FIG. 10C shows the total transfer functions 1020-1028 for these same pixel pitches. In FIG. 10C, note how the detector response helps to further reduce the imaging content at frequencies above the detector sampling frequency.

TABLE 3

Design Parameters for Triplet with Adjustable Optical Cutoff Frequency

| Surface | Curvature | Thickness (mm) | 4 μm | 6 μm | 9 μm | 12 μm | 15 μm |
|---|---|---|---|---|---|---|---|
| 1 | 0.09 | 6.95 | | | | | |
| 2 | 0.17 | | 3.2806 | 3.3019 | 3.4034 | 3.3129 | 3.3565 |
| 3 | 0.10 | 2.85 | | | | | |
| 4 | 0.11 | | 5.1318 | 5.1689 | 5.1382 | 5.2465 | 5.2372 |
| 5 | −0.01 | 3.95 | | | | | |
| 6 | −0.11 | | 35.4028 | 35.2279 | 35.1176 | 35.0907 | 35.0328 |

The low-pass characteristics of the optical subsystem are typically a function of both the contrast above and below the optical cutoff frequency of the lens system, which in this example is designed to match the detector sampling frequency. For this particular example, the designs goals for the integrated optical low pass filter were the following:

1. Optical MTF contrast greater than 10% at all frequencies below the detector sampling frequency.
2. "Aliasing Strehl ratio" of 15% or less, and preferably 10% or less.

The aliasing Strehl ratio is defined as the energy in the actual optical MTF at frequencies above the detector sampling frequency, divided by the energy in the same frequency band for an equivalent diffraction limited optical system. This definition is similar to the standard Strehl ratio, differing only in that the integration is taken from the optical cutoff frequency up to the diffraction limit instead of from DC up to the diffraction limit. The aliasing Strehl ratio is a measure of how effectively aliasing is suppressed. In the design shown in Table 3, the aliasing Strehl ratio for the different settings (cutoff frequencies) are 12%, 8.5%, 8.4%, 8.4% and 8.7%, respectively.

Similar metrics based on the total transfer function, rather than the optical MTF, can also be used. For example, one criteria could be that the total transfer function computed for a 50% fill-factor detector has a contrast of less than 1%, and preferably less than 0.5%, for all frequencies that are higher than 1.5 times the detector sampling frequency. This requirement could be coupled with a requirement in the sampling band, for example a requirement that the TTF must be greater than 10% for all frequencies below the detector sampling frequency.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An adjustable optical system for use with detector subsystems having different detector sampling frequencies, the optical system comprising at least two optical components, at least one of which is moveable, the optical components acting in concert to produce an image on the detector subsystem and further acting in concert to produce low pass filtering of the image, the low pass filtering characterized by an optical cutoff frequency that can be adjusted by moving the moveable optical component(s), the optical cutoff frequency adjusted based on the detector sampling frequency so that an optical MTF of the optical system is greater than 10% at all frequencies below the detector sampling frequency and an aliasing Strehl ratio of the optical system is 15% or less.

2. The adjustable optical system of claim 1 wherein the moveable optical component(s) comprise one or more moveable optical lenses, wherein moving the lens(es) along an optical axis adjusts the optical cutoff frequency.

3. The adjustable optical system of claim 1 comprising a triplet lens system.

4. The adjustable optical system of claim 3 wherein the triplet lens system includes three lens components and the optical cutoff frequency is adjusted by moving a center lens component along the optical axis and adjusting a back focal length.

5. The adjustable optical system of claim 1 wherein the optical system is suitable for use as a subsystem in an electro-optic imaging system, and the optical cutoff frequency is adjusted to reduce aliasing in the electro-optic imaging system.

6. The adjustable optical system of claim 1 wherein the optical system is suitable for use as a subsystem in an electro-optic imaging system, and the optical cutoff frequency is adjusted to reduce moire effects in the electro-optic imaging system.

7. The adjustable optical system of claim 1 wherein the optical system is suitable for use with different pitch detectors, and the optical cutoff frequency can be adjusted to match the pitch of the detector.

8. The adjustable optical system of claim 1 wherein, in comparison to an equivalent diffraction-limited optical MTF, the optical MTF contains a higher fraction of energy in a pass band of frequencies below the detector sampling frequency.

9. The adjustable optical system of claim 1 wherein the optical MTF is greater than 15% at all frequencies below the detector sampling frequency.

10. The adjustable optical system of claim 1 wherein the aliasing Strehl ratio is always 10% or less.

11. An electro-optic imaging system comprising:
a detector subsystem(s) having different detector sampling frequencies;
an adjustable optical subsystem, the optical system comprising at least two optical components, at least one of which is moveable, the optical components acting in concert to produce an image on the detector subsystem;
the optical components acting in concert to produce low pass filtering of the image, the low pass filtering characterized by an optical cutoff frequency that can be adjusted by moving the moveable optical component(s), the optical cutoff frequency adjusted based on the detector sampling frequency so that a total transfer function (TTF) of the optical subsystem and detector subsystem together is greater than 10% at all frequencies below the detector sampling frequency and less than 5% at all frequencies above 1.5× the detector sampling frequency; and a digital image processing subsystem for processing the image captured by the detector subsystem.

12. The electro-optic imaging system of claim 11 wherein the moveable optical component(s) comprise one or more moveable optical lenses, and moving the lens(es) along an optical axis adjusts the optical cutoff frequency.

13. The electro-optic imaging system of claim 11 wherein the optical cutoff frequency is adjusted to reduce aliasing in the electro-optic imaging system.

14. The electro-optic imaging system of claim 11 wherein the optical cutoff frequency is adjusted to reduce moire effects in the electro-optic imaging system.

15. The electro-optic imaging system of claim 11 wherein the detector subsystem includes detectors with an adjustable pitch, and the optical cutoff frequency is adjusted based on the pitch of the detectors.

16. The electro-optic imaging system of claim 11 wherein, in comparison to an equivalent diffraction-limited optical MTF, the optical MTF of the optical subsystem contains a higher fraction of energy in a pass band of frequencies below the detector sampling frequency.

17. The electro-optic imaging system of claim 11 wherein the TTF is greater than 15% at all frequencies below the detector sampling frequency.

18. The electro-optic imaging system of claim 11 wherein the TTF is less than 1% at all frequencies above 1.5× the detector sampling frequency.

* * * * *